(12) United States Patent
Pine

(10) Patent No.: US 11,110,952 B2
(45) Date of Patent: Sep. 7, 2021

(54) CONDITIONER FOR STEERING WHEEL

(71) Applicant: GENTHERM GMBH, Odelzhausen (DE)

(72) Inventor: Amanda Caroline Pine, Novi, MI (US)

(73) Assignee: GENTHERM GMBH, Odelzhausen (DE)

( * ) Notice: Subject to any disclaimer, the term of this patent is extended or adjusted under 35 U.S.C. 154(b) by 135 days.

(21) Appl. No.: 16/475,098

(22) PCT Filed: Jan. 30, 2018

(86) PCT No.: PCT/IB2018/000158
§ 371 (c)(1),
(2) Date: Jun. 30, 2019

(87) PCT Pub. No.: WO2018/142221
PCT Pub. Date: Aug. 9, 2018

(65) Prior Publication Data
US 2019/0344820 A1    Nov. 14, 2019

Related U.S. Application Data

(60) Provisional application No. 62/455,093, filed on Feb. 6, 2017.

(51) Int. Cl.
*B62D 1/06* (2006.01)

(52) U.S. Cl.
CPC .................... *B62D 1/065* (2013.01)

(58) Field of Classification Search
CPC ............... B62D 1/065; B60H 1/00292; B60H 2001/003; F25B 21/02
See application file for complete search history.

(56) References Cited

U.S. PATENT DOCUMENTS 1,615,635 A    1/1927 Kuno
2,163,450 A    6/1939 Preble
(Continued)

FOREIGN PATENT DOCUMENTS

| DE | 102007048347 A1 | 4/2008 |
| WO | 2015/175335 A1 | 11/2015 |
| WO | 2016/111359 A1 | 8/2017 |

OTHER PUBLICATIONS

International Search Report and Written Opinion for International Application PCT/IB2018/000158, dated Jun. 22, 2018.
(Continued)

*Primary Examiner* — Elizabeth J Martin
(74) *Attorney, Agent, or Firm* — The Dobrusin Law Firm, P.C.

(57) ABSTRACT

A conditioning system that includes (a) a plurality of conditioning modules, each conditioning module including: (i) one or more heat sinks and (ii) one or more thermoelectric devices in communication with the one or more heat sinks; (b) one or more air movers in fluid communication with the heat sink; the plurality of conditioning modules are located within a rim of a steering wheel and the thermo-electric device is in thermal contact with the rim so that when the plurality of conditioning modules are turned on, the plurality of conditioning modules change a temperature of the rim of the steering wheel; and the one or more air movers move fluid across the heat sink.

20 Claims, 3 Drawing Sheets

(56) References Cited

U.S. PATENT DOCUMENTS

| | | | |
|---|---|---|---|
| 4,640,340 | A | 2/1987 | Noda et al. |
| 5,850,741 | A | 12/1998 | Feher |
| 6,007,420 | A | 12/1999 | Harm et al. |
| 6,093,908 | A | 7/2000 | Haag |
| 6,298,750 | B1 | 10/2001 | Kerner et al. |
| 6,414,270 | B1 | 7/2002 | Sugiyama et al. |
| 6,533,184 | B1 | 3/2003 | Kim |
| 7,145,102 | B2 | 12/2006 | Hadzizukic et al. |
| 7,908,941 | B2 | 3/2011 | Menaldo et al. |
| 8,993,929 | B2 | 3/2015 | Maranville et al. |
| 2004/0168540 | A1 | 9/2004 | Weiss |
| 2009/0314128 | A1* | 12/2009 | Rick ............... B62D 1/065 74/558 |
| 2013/0180354 | A1* | 7/2013 | Maranville ........ B60H 1/00292 74/552 |
| 2015/0102024 | A1 | 4/2015 | Baefuss et al. |
| 2015/0329136 | A1 | 11/2015 | Lofy et al. |
| 2015/0329137 | A1 | 11/2015 | Onica |
| 2017/0352794 | A1 | 12/2017 | Takagi et al. |
| 2019/0084608 | A1* | 3/2019 | Kim ............... F25B 21/04 |

OTHER PUBLICATIONS

International Preliminary Report on Patentability for International Application PCT/IB2018/000158, dated Aug. 6, 2019.

* cited by examiner

CONDITIONER FOR STEERING WHEEL

FIELD

The present teachings generally relate to a conditioner that heats, cools, and/or ventilates a steering wheel.

BACKGROUND

The present teachings are predicated upon providing a steering wheel that is heated and ventilated and/or actively cooled. Attempts have been made to provide heating and cooling to steering wheels. Typical steering wheel heaters include one or more lay wires that are integrated into the steering wheel and upon application of electrical power the resistive lay wires generate heat. Some attempts have been made to cool steering wheels; however, due to limited packing space cooled steering wheels have not been commercialized. Further, the heating and/or cooling elements cannot interfere with movement of a steering wheel or steering wheel controls, which limits the connection locations and area where components may be placed within the steering wheel. Additionally, many, if not all, steering wheels include air bags and the heating and/or cooling components may need to be located outside of the air bag regions, which further limits the locations that componentry may be placed within the steering wheel. Attempts have been made to remotely locate the conditioning elements and move conditioned fluids into the steering wheel to provide cooling, however, these designs are limited by the packaging space available to provide cooling fluids for cooling. Finally, any heating and/or cooling elements need flexibility to accommodate movement of the steering wheel.

Examples of attempts to heat steering wheels may be found in U.S. Pat. Nos. 1,615,635; 2,163,450; 6,093,908; 6,414,270; and 7,145,102 all of which are incorporated by reference herein in their entirety for all purposes. Examples of attempts to cool steering wheels may be found in U.S. Pat. Nos. 4,640,340; 5,850,741; 6,007,420; 6,298,750; 6,533,184; 7,908,941; and 8,993,929; and U.S. Patent Application Publication No. 2004/0168540; 2015/0329136; and 2015/0329137 all of which are incorporated by reference herein in their entirety for all purposes.

It would be advantageous to have a steering wheel that is both heated and cooled around all or a portion of a circumference. It would be advantageous to have a heated and cooled steering wheel that is responsive so that heating and/or cooling may provide rapid results (i.e., less than 1 minute). What is needed is a heated and/or cooled steering wheel that provides thermal conditioning within the limited packaging space of the steering wheel without having to locate cooling components external to the steering wheel. What is needed is a heated and/or cooled steering wheel that moves fluid from one or more spokes and through a rim of the steering wheel.

SUMMARY

The present teachings meet one or more (if not all) of the present needs by providing: a conditioning system comprising: (a) a plurality of conditioning modules, each conditioning module including: (i) one or more heat sinks and (ii) one or more thermoelectric devices in communication with the one or more heat sinks; (b) one or more air movers in fluid communication with the heat sink; wherein the plurality of conditioning modules are located within a rim of a steering wheel and the thermo-electric device is in thermal contact with the rim so that when the plurality of conditioning modules are turned on, the plurality of conditioning modules change a temperature of the rim of the steering wheel; and wherein the one or more air movers move fluid across the heat sink.

The teachings herein surprisingly solve one or more of these problems by providing a steering wheel that is both heated and cooled around an entire circumference, or at least a substantial portion of the circumference. The present teachings provide a heated and cooled steering wheel that is responsive so that heating and/or cooling may provide rapid results (i.e., less than 1 minute). The present teachings provide a heated and/or cooled steering wheel that provides thermal conditioning in within the limited packaging space of the steering wheel without having to locate cooling components external to the steering wheel.

DETAILED DESCRIPTION

Figure 1:
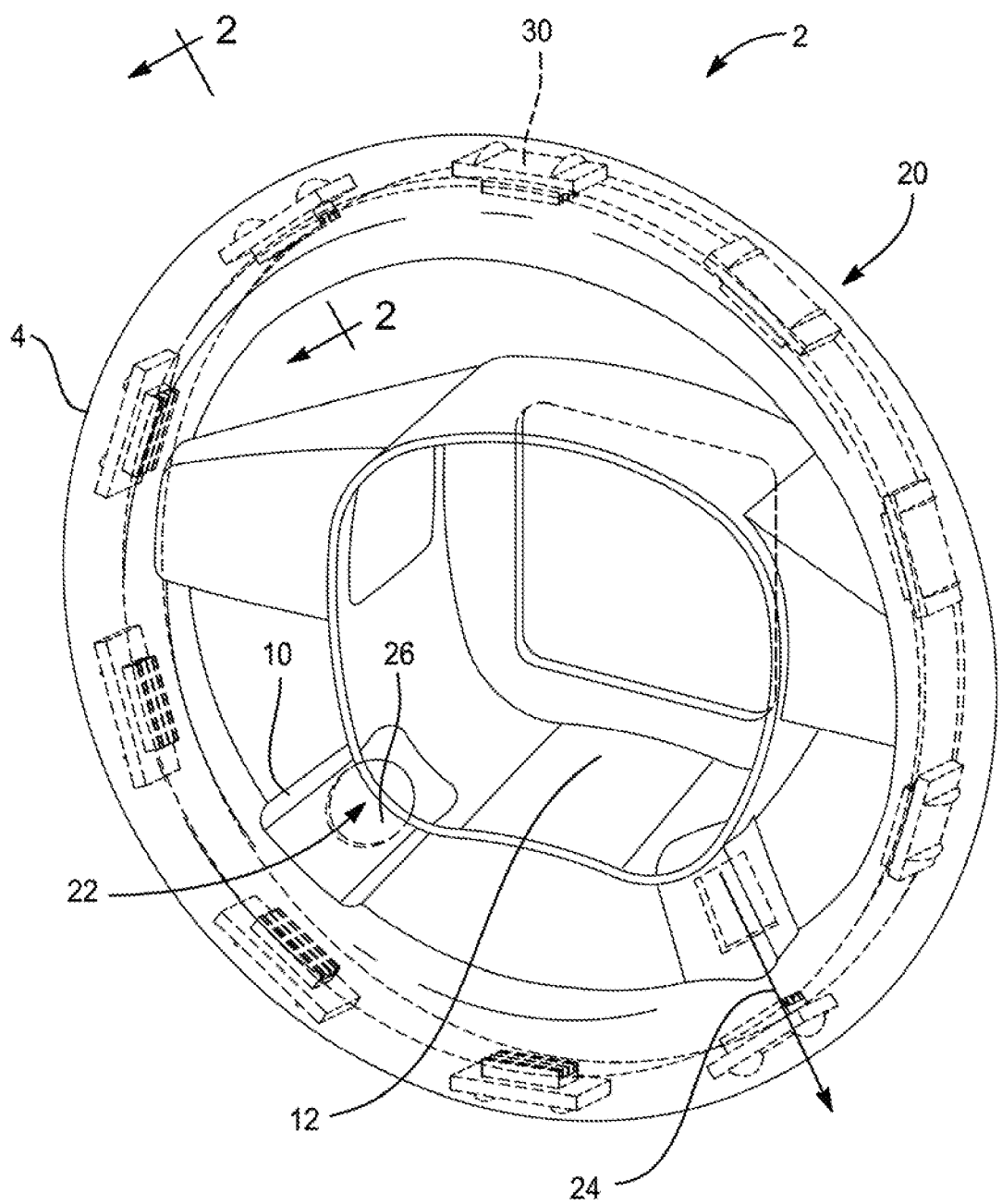
FIG. 1 illustrates a perspective view of a conditioning system incorporated into a steering wheel.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a conditioning system for a component of a vehicle and particularly for a steering wheel. The steering wheel may include a movable part and a static part. A portion of the conditioning system may be located in the movable part (e.g., steering wheel) and a portion of the conditioning system may be located in the static part (e.g., column) and the two parts may be in communication. Preferably, all of the conditioning system may be located within the movable part (with the exception of wires that extend to a remote controller). More preferably, all of the components may be located within the wheel (e.g., rim) and spokes of the steering wheel that are connected to and extend from the rim.

The conditioning system may function to change a temperature of one or more parts of a vehicle. Preferably, the conditioning system functions to change a temperature of a rim or one or more spokes of a steering wheel of a vehicle. Most preferably, the conditioning system heats, cools, or both a rim of a steering wheel. The conditioning system may function to push, pull, or both air through a channel in the rim, a channel in the one or more spokes, or a combination thereof. The conditioning system may be entirely located within the steering wheel. A portion of the conditioning system may be located within the rim and a portion of the ventilation system may be located within one or more spokes. For example, the conditioning modules may be located in the rim and the blowers may be located in the spokes of the steering wheel. The conditioning system may be protected from contact by a user. The conditioning system may be protected by the rim, the spokes, or both. The conditioning system may be static relative to the rim, the spokes, or both. For example, if the rim moves then the conditioning modules may move, but the conditioning modules may not move independent of the rim or the spokes. The conditioning system may be free of contact with a vehicle's heating, ventilation, and air conditioning system. The conditioning system when covered by a trim layer is free of read-thru (e.g., the driver or occupant cannot feel the ventilation system through the trim layer). The conditioning system may be free of read through when a trim layer is not located over the rim. The conditioning system may include a built in trim cover so that a separate trim cover is not needed to cover the ventilation system. Preferably, the steering wheel includes one or more layers (or pieces) having one or a plurality of channels therebetween, one or a plurality of ventilation holes, extending around all or a portion of a circumference of a rim, or both. More preferably, one or more conditioning modules are located within the channels and the one or more conditioning modules extend around the rim of the steering wheel.

The one or more conditioning modules function to change a temperature of the steering wheel, a fluid (e.g., air) within the steering wheel, or both. The one or more conditioning modules may function to change a temperature of all or a portion of a rim of a steering wheel. Preferably, the conditioning system includes a plurality of conditioning modules. The conditioning modules may be directly in contact with a portion of a rim of the steering wheel. The one or more conditioning modules may be located within a hollow portion of the rim. The conditioning modules may include a heat sink, thermoelectric device, boss, thermal transfer material, or a combination thereof. The conditioning modules may be connected to or in contact with one or more parts of the rim by a thermal transfer material.

The thermal transfer material may function to connect the conditioning modules to one or more parts of the steering wheel, one or more other parts of the conditioning modules, or both. The thermal transfer material may function to allow thermal energy to transfer from each of the one or more conditioning modules to the rim of the steering wheel or vice versa. The thermal transfer material may be a thermal adhesive, a thermal grease, or both. The thermal transfer material may be solder, a polyimide, or both. The thermal transfer material may form a fixed connection between the conditioning modules and the steering wheel (e.g., rim, or spoke) without any additional fasteners. The thermal transfer material may be used in conjunction with a mechanical fastener, press fit to the rim, press fit between bosses, or a combination thereof. The mechanical fasteners may be a screw, nut, bolt, pin, rivet, or a combination thereof. The mechanical fastener, the thermal transfer material, or both may connected to a first piece, second piece, boss, or a combination thereof.

The heat sink may function to remove waste energy from the conditioning system. The heat sink may have a portion in communication with a thermoelectric device and a portion in communication with fluid flow through the rim of the steering wheel. The heat sink may include one or more fins and preferably a plurality of fins. The heat sink may be configured for communication with air flow. The heat sink may be free of contact with a liquid. The heat sink may have fins that are perpendicular to a direction of air flow through the channel. Preferably, the fins are parallel to a direction of air flow through the channel. The heat sink may have one continuous fin that is sinusoidal and extends from a first end to a second end of the heat sink. The heat sink may have a body portion that is connected to or in communication with the one or more fins. The body portion and fins may be one integral piece. The body portion and fins may be discrete pieces and may be connected together by thermal transfer material, solder, welding, a mechanical fastener, or a combination thereof. The body portion, fins, or both may be made of the same material or may be made of different materials. The heat sink may be made of any conductive material. Preferably, the heat sink is made of metal. The heat sink may be made of or include aluminum, nickel, copper, a ferrous material, molybdenum, brass, or a combination thereof. The heat sink may be directly connected to a thermoelectric device or connected to the thermoelectric device by a thermal transfer material. The heat sink may have an area that is greater than an area of the thermoelectric device.

The thermoelectric device may function to provide conditioning to a portion of the rim. The thermoelectric device may provide conditioning to a first piece, a second piece, of both of a rim so that a temperature of the rim is changed. The thermoelectric device may heat, cool, or both the rim so that a temperature of the rim is increased or decreased depending on demand. The thermoelectric device may provide conditioning directly to one or more pieces of the rim. The thermoelectric device may provide conditioning to the rim through a thermal transfer material. The thermoelectric device may include a first plate, a second plate, a conductive material in communication with the first plate, a conductive material in communication with the second plate; a p-type material, an n-type material, or a combination thereof. The first plate and the second plate may be made of a ceramic substrate. The p-type material may extend between a conductive material in communication with the first plate and a conductive material in communication with the second plate. During conditioning, power may enter the thermoelectric device through the first plate, the second plate, the conductive metal, or a combination thereof. The conditioning power may extend from the conductive material on one side to the other side by extending through the n-type material to the p-type material. The thermal transfer material may be in communication with the first plate, the second plate, or both. The first plate may be a hot plate when current flows in a first direction and may be cold plate when current flows in a second direction. The second plate may be opposite the first plate. The thermoelectric device may create a change in temperature of about 5 degrees C. or more, about 10 degrees C. or more, or even about 15 degrees C. or more when heating or cooling. The thermoelectric device may be mounted directly on a first part or a second part of a rim. Preferably, the thermoelectric device is mounted adjacent one or more bosses.

The one or more bosses may support the thermoelectric device, support the heat sink, or both. Each of the one or more thermoelectric devices may be located between a pair of opposing bosses. The thermoelectric device may be press fit between the bosses. The thermoelectric devices may be located between the one or more bosses. The pair of opposing bosses may prevent the thermoelectric devices from moving during movement of the steering wheel, flexing of the rim, impacts on one or more locations of the rim, or a combination thereof. The one or more heat sinks may be in communication with one or more bosses. The one or more heat sinks may extend over the thermoelectric device on one or more sides and over a boss. The one or more heat sinks may be connected to the bosses by a mechanical fastener, the thermal transfer material, the bosses extending into a portion of the heat sink to form a connection, or a combination thereof. The bosses may be made of a same material as the first piece, second piece, or both pieces of the rim. The bosses may be made of a different material than the first piece, the second piece, or both pieces. The bosses may be made of an insulating material. The bosses may be made of plastic, ceramic, a foam, a high density foam, a polymer, or a combination thereof. The bosses may be an insert that is located between the heat sink and the first part or the second part. The bosses may be located at points along the heat sink. The bosses may be substantially the same length as the heat sinks. The bosses may elevate the heat exchanger into a fluid stream created by one or more air movers.

The one or more air movers may function to circulate air through the steering wheel. The one or more air movers may function to push air into the rim, pull air from the rim, or both. The one or more air moves may be located outside of the rim. The one or more air movers may be located within a movable part (e.g., the steering wheel). The one or more air movers may be located within a spoke that is connected to or in communication with the rim. The one or more air movers may be entirely located within a spoke. The conditioning system may include two air movers and each air mover may be located with its own spoke. The conditioning system may include two air movers and each air mover may be located within a single spoke and may be divided so that air may be circulated around the rim of the steering wheel. The conditioning system may include a single air mover. The air movers may be an axial fan, a radial fan, or a combination of both. The air movers may be located proximate to an exit hole in a spoke. The air movers may have an outlet that aligns with an opening in the spoke so that the air mover and spoke are substantially flush. The air mover may have a cover that prevents objects from entering into the conditioning system (e.g., food, fluids, fingers, writing utensils, clothing, or a combination thereof). The air movers may be located in an inlet, an outlet, or both.

The inlet, the outlet, or both may function to allow for air to move into the conditioning system, exit the condition system, or both. The inlet may allow for ambient air to enter into the conditioning system to remove waste heat, waste cool, or both. The outlet may allow for heated waste air, cooled waste air, or both to be removed from the conditioning system. The outlet and inlet may be located in different spokes. The outlet and inlet may be located within the same spoke. The outlet and inlet may be separated by a dividing wall. The outlet and inlet may be a hole that provides access into a cavity within a spoke. The outlet and inlet may provide egress and ingress respectively into the channel of the conditioning system. An air mover may be located within an inlet and an outlet of the spoke. The inlet and outlet may be located within the rim. Preferably, the inlet and the outlet are located within a spoke that is in communication with a channel within the rim The one or more spokes may extend between the rim and the hub. The one or more spokes may support the rim from the hub. The one or more spokes may be located between about 3 o'clock and about 9 o'clock, preferably between about 4 o'clock and about 8 o'clock, and more preferably between about 5 o'clock and about 7 o'clock. The steering wheel may have one spoke at about 5 o'clock and one spoke at about 7 o'clock. When one spoke is present the spoke may be present at about 6 o'clock. The spokes may be hollow. The spokes may have one channel. A channel of the spoke may be aligned with and connected to a channel within the rim. The spokes may have two channels. The spokes may have a channel with two branches that are separated by a divider. When two air movers are located within one spoke, the air movers may be separated by a divider so that air flow in two different directions may extend through the spoke. The spokes may house one or more air movers. One spoke may house two air movers. Wires of the air movers may extend from the hub, the steering column, or both down the spoke to the air movers and to the rim. The wires may be located within the channels within the spoke. The spoke, the channel in the spoke, or both may be in fluid communication with the rim and preferably a channel within the rim.

The rim may function to be a portion of a steering wheel that a user grips to steer a vehicle. The rim functions to be a location where the user contacts the steering wheel. The rim may include all or a portion of the conditioning system. Preferably, the rim includes the conditioning modules. More preferably, the rim includes a plurality of conditioning modules and the conditioning modules extends around about 180 degrees or more, about 270 degrees or more, or about 360 degrees of the rim. The condition modules may be located within the rim at primary gripping locations (e.g., 10 o'clock and 2 o'clock). The rim may be one solid piece. The rim may include a metal core. The rim may be free of a metal core. The rim may include a channel. The channel may include a fluid. The fluid may be ambient air. Preferably, the channel includes air. More preferably, the channel is free of a liquid. The rim may be free of a core and may have an open space extending around the rim that forms a channel.

The channel may function to hold one or more components of the conditioning system. The channel may create a continuous fluid path around the rim. The channel may be segregated into discrete parts. The rim may include one or more channel segments, two or more channel segments, three or more channel segments, or even four or more channel segments. Each channel segment may include a string of conditioning modules. Each channel segment of a rim may begin and end at a spoke so that a loop is formed that extends through the spokes. Preferably, the rim includes a single channel that extends substantially all of the way around the rim. The channel may be sufficiently large that the channel may hold one or more conditioning modules and preferably a plurality of conditioning modules. The channel may hold a heat sink, thermoelectric device, thermal transfer material, boss, or a combination thereof at various locations around the channel. The channel may have a cross-sectional shape that is round, square, pentagonal, octagonal, "D" shaped, rectangular, triangular, symmetrical, asymmetrical, or a combination of shapes. The channel may only include an inlet and an outlet. The channel may include holes that extend through the rim so that air may be moved from the channel and out the holes into contact with an occupant. The channel may be formed within one solid piece of a rim. Preferably, the channel is formed between two or more pieces that are connected together.

The two or more pieces function to create a rim that a user grips to control a vehicle. The two or more pieces may create a generally circular or generally oval rim with a hollow center or a channel within the rim. The two or more pieces may be generally "U" shaped, generally "C" shaped, or both so that when connected together a hollow space is formed therebetween. The two or more pieces may be made of the same material. Preferably, the two or more pieces are made of different materials. For example, a first piece may be made of an insulating material and a second piece may be made of a conductive material. The two or more pieces may be made of metal, a polymer, ceramic, a foam, a high density foam, a natural material, a synthetic material, urethane, a plastic, a thermoplastic, a thermoset, steel, ferrous material, aluminum, or a combination thereof. Preferably, the steering wheel includes two internal pieces that are wrapped by a trim layer. More preferably, the first piece is made of or includes a conductive material and the second piece is made of or includes an insulating material. The first piece may transfer the conditioning to the occupant so that the occupant feels the heat and/or cooling of the conditioning system. The conditioning modules may only be in contact with the first piece or the second piece. The conditioning modules may alternatingly be in contact with the first piece and the second piece. The conditioning modules may be free of contact with an insulating part. The second piece may insulate the channel so that the waste energy is removed without undesirably heating and/or cooling the steering wheel. The first piece may have a portion that extends over an overlaps all or a portion of the second piece so that conditioning is spread around an entire circumference of the rim. For example, a conductive flap may extend over the second piece so that thermal energy may extend over the second part. The two or more pieces may be connected to or include the spoke so that the rim is connected to the hub.

The hub may function to connect the steering wheel to a steering column. The hub may include an air bag. The hub may be free of components of the conditioning system. The hub may assist in supporting the spokes and the rim. The hub may located in a center of the steering wheel. The hub, spokes, rim, or a combination thereof may be fully or partially covered by a trim layer. The hub may be free of a trim layer.

The trim layer may function to hold the parts of the rim together. The trim layer may function to create an aesthetically and tactically pleasing gripping part of the steering wheel. The trim layer may allow for thermal transfer from the rim, the conditioning system, or both to the user. The trim layer may include one or more heater wires or cover one or more heater wires. The trim layer may cover the steering wheel and wires extending into the steering wheel to power or control the conditioning system.

The conditioning modules may be arranged in one or more strings of conditioning modules. Each string of conditioning modules may include about 2 or more, about 4 or more, or about 5 or more conditioning modules. Each string of conditioning modules may include about 20 or less, 15 or less, or about 10 or less conditioning modules. Each of the conditioning modules in a string may be connected in series. The steering wheel may include one or more strings of conditioning modules and preferably two or more strings of conditioning modules. The steering wheel may include three or more strings of conditioning modules and even four or more strings of conditioning modules. When more than one string of conditioning module are present the strings may be connected in parallel. For example, if two strings are present then one string may extend from 12 o'clock to 6 o'clock on a side by 3 o'clock and a second string may extend from 12 o'clock to 6 o'clock on a side by 9 o'clock. If four strings are present then one string may extend from 12 o'clock to 3 o'clock, a second string may extend from 3 o'clock to 6 o'clock, a third string may extend from 6 o'clock to 9 o'clock, and a fourth string may extend from 9 o'clock to 12 o'clock. When more than string is present the conditioning modules in a string may be directly in row. When more than one string is present a second string may have an alternating relationship with the first string. For example, the conditioning modules from the first string may be located adjacent conditioning modules from a second string around the rim. Each of the conditioning modules may be connected together by a joint.

The joint may function to electrically connect a conditioning module to a power wire, a signal wire, or both. The joint may be a mechanical joint (e.g., a fastener, wire nut) or a bonded joint (e.g., weld, solder, brazing, melting). The joint may connect the conditioning module to one or more wires so that power, signals, or both a transferred from a controller to each of the conditioning modules.

The one or more wires may function to carry power, a signal, or both to one or more conditioning modules that power, control, or both the conditioning modules. The one or more wires may function to control one or more strings of conditioning modules. Each string of conditioning modules may include its own wire or wires. The wires may extend from conditioning module to conditioning module within a string. The wires may extend between a boss and a wall of the channel. The wires may extend between a boss and a thermoelectric device. The wires may extend through spokes that include the air movers. The wires may extend through spokes that are free of air movers. The wires may connect to a first end of a conditioning module and terminate at a joint and then a new wire may extend from a second end of a conditioning module so that power, signals, or both may be supplied to subsequent conditioning modules. The one or more wires may be connected to a first piece, a second piece, the heat sink, or a combination thereof. The one or more wires may be connected to a wall within the channel or the hollow space within the rim, the spokes, or both. The one or more wires may extend into the inlet, the outlet, or both of the spokes. The one or more wires may extend within the spokes to the rim and around all or a portion of the rim and then exit though a spoke. The one or more wires may extend around an entire periphery of the steering wheel. The one or more wires may extend partially around a periphery of the steering wheel (e.g., 180 degrees or less). The one or more wires may be connected to a temperature sensor that monitors a temperature of the conditioning system, the steering wheel, the rim, or a combination thereof.

The one or more temperature sensors may function to monitor the temperature of the system, the steering wheel, the rim, a conditioning module, a heat sink, a thermoelectric device, or a combination thereof. The temperature sensors may monitor the temperature of an individual conditioning module. The temperature sensors may be connected to a controller. The temperature sensors may be embedded in a thermoelectric device (e.g., internally mounted). The temperature sensors may be mounted outside of a thermoelectric device (e.g., externally mounted). The conditioning system may have one or more temperature sensors. The conditioning system may have a plurality of temperature sensors. The conditioning system may have one temperature sensor associated with a conditioning module and one temperature sensor external to the conditioning modules. The temperature sensors may be a thermistor, a negative coefficient thermistor, a resistance temperature detector, a thermocouple, a semiconductor-based sensor, or a combination thereof. The temperature senor may turn off the heat or cool when the temperature passes a predetermined temperature. The temperature sensor may be connected to a controller that regulates the temperature of the steering wheel.

FIG. 1 illustrates a steering wheel 2 including a conditioning system 20. The steering wheel 2 includes a rim 4, connected to a hub 12 by spokes 10. The spokes 10 at the bottom (i.e., 5 o'clock and 7 o'clock) are hollow and serve as an inlet 22 and outlet 24 for air to be moved through the rim 4 of the steering wheel 2. An air mover 26 is located within the inlet 22 and circulates air through the rim 4. A plurality of conditioning modules 30 are located within the rim 4 and spaced apart around the rim 4.

Figure 2:
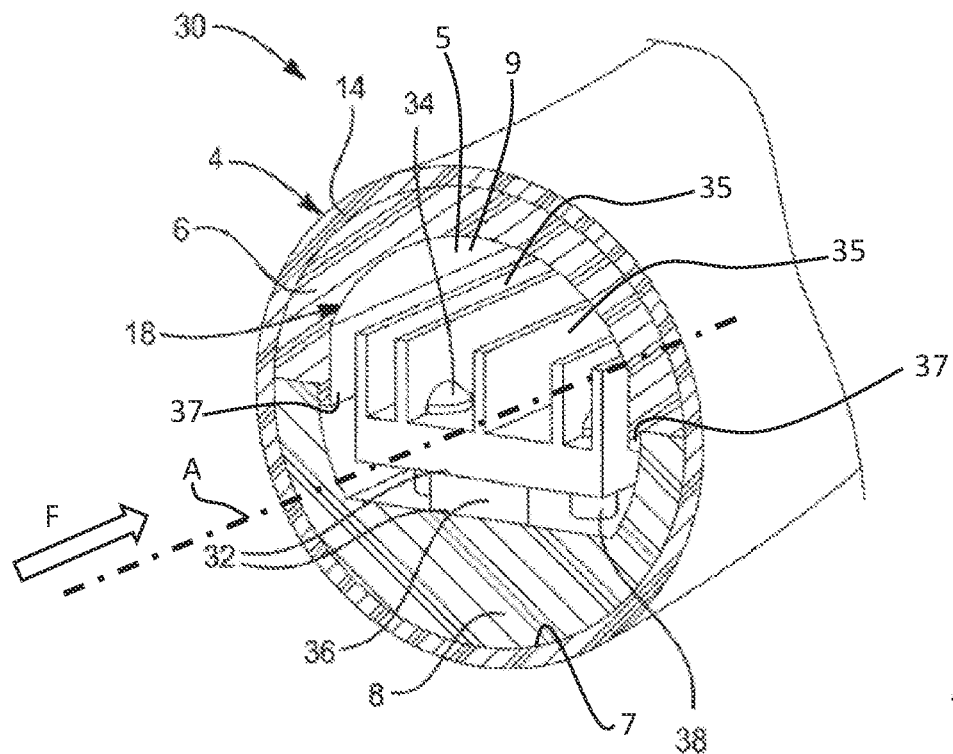
FIG. 2 illustrates a cross section of a rim of the steering wheel of FIG. 1 cut along lines II-II.

FIG. 2 illustrates a cross-sectional view of the rim 4 of FIG. 1 along lines II-II. The rim 4 houses the conditioning modules 30. The rim 4 includes a first piece 6 and a second piece 8 with a channel 18 located between the first piece 6 and the second piece 8. The first piece 6 and the second piece 8 are wrapped by a trim layer 14. As shown, the second piece 8 is connected to the conditioning modules 30 so that conditioning is provided through the second piece 8. The thermal transfer material 32 is located between second piece 8 and the conditioning modules 30. The thermal transfer material 32 is located between and directly in contact with a thermo-electric device 36 and the second piece 8 and the thermo-electric device 36 and the heat sink 34. A boss 38 is located on each side of the thermos-electric device 36 and provide support to the heat sink 34.

The first piece 6 and the second piece 8 cooperate to define the hollow channel 18 between the first piece 6 and the second piece 8. The first piece 6 has a portion 37 that extends over and overlaps all or a portion of the second piece 8. The heat sink 34 has fins 35 that are arranged parallel to a direction of the of the stream of fluid F through the channel 18.

Figure 3:
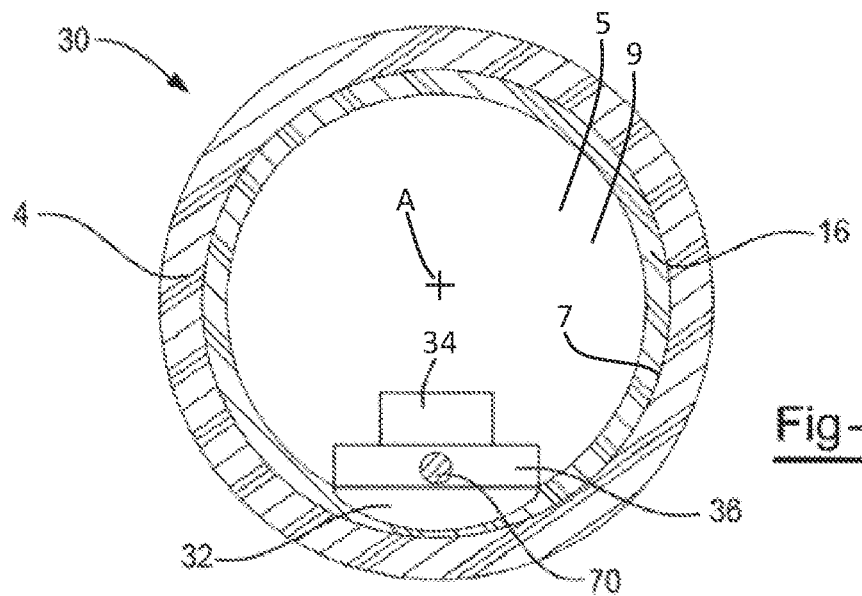
FIG. 3 illustrates a cross section of a rim including the conditioning system.

FIG. 3 illustrates a cross-sectional view of the rim 4 including a conditioning module 30. The rim 4 includes an insulating layer 16 around a portion of the rim to prevent heat transfer from the air moving through the rim 4. The conditioning module 30 includes a heat sink 34 connected to a thermoelectric device 36 that is in communication with the rim 4 by a thermal transfer material 32. The insulating layer 16, as shown, assists in connecting the conditioning modules 30 within the rim 4. As shown, the thermoelectric device 36 includes temperature sensor 70.

The rim 4 has a hollow portion 5. The hollow portion 5 has an interior surface 7 defining a central cavity 9 that is centered about a central axis A of the rim 4. The thermo-electric devices 36 are spaced apart along the central cavity 9.

Figure 4:
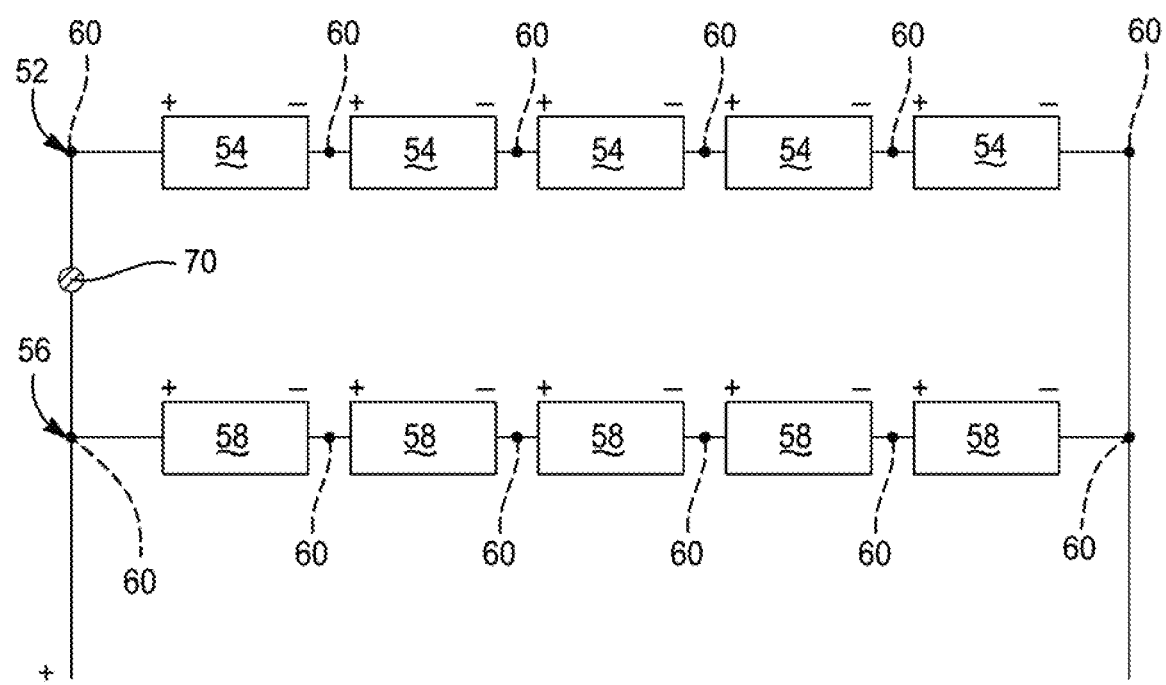
FIG. 4 illustrates a circuit diagram.

FIG. 4 illustrates a circuit 50 having a first string of conditioning modules 52 and a second sting of conditioning modules 56 that are electrically connected in parallel. The string of conditioning modules 52 includes a plurality of conditioning modules in series 54 and the parallel string of conditioning modules 56 include a plurality of conditioning modules in series 58. Each of the conditioning modules in series 54, 58 are in series in their respective string 52, 56. A temperature sensor 70 is located within the circuit 50 that monitors a temperature of the system.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A conditioning system comprising:
   a. a plurality of conditioning modules, each including:
      i. one or more heat sinks and
      ii. one or more thermoelectric devices in communication with the one or more heat sinks;
   b. one or more air movers in fluid communication with the one or more heat sinks;
   wherein the plurality of conditioning modules are located within a hollow portion of a rim of a steering wheel, the rim includes a first piece and a second piece that cooperate to define a hollow channel between the first piece and the second piece, the plurality of conditioning modules are in contact with only the first piece, the hollow channel having an interior surface defining a central cavity and the one or more thermoelectric devices are spaced apart along the central cavity, and the one or more thermoelectric devices are in direct thermal contact with the interior surface of the hollow channel so that when the plurality of conditioning modules are turned on, the plurality of conditioning modules change a temperature of the rim of the steering wheel, wherein the one or more heat sinks are located on the one or more thermoelectric devices and separated from the rim by the one or more thermoelectric devices so that the one or more heat sinks are located within a stream of fluid created by the one or more air movers; and wherein the one or more air movers move the fluid across the one or more heat sinks.

2. The conditioning system of claim 1, wherein the rim is connected to a hub of the steering wheel with spokes, and the one or more air movers are located within one of the spokes.

3. The conditioning system of claim 1, wherein the one or more air movers pull the fluid from the rim to exhaust the fluid from the rim.

4. The conditioning system of claim 1, wherein the one or more air movers push the fluid into the rim to circulate the fluid through the rim.

5. The conditioning system of claim 1, wherein the one or more air movers are located outside of a hub of the steering wheel.

6. The conditioning system of claim 1, wherein a thermal transfer material is located between the one or more thermoelectric device and a part of the rim of the steering wheel.

7. The conditioning system of claim 1, wherein the plurality of conditioning modules are connected together forming two or more strings of conditioning modules, and each of the two or more strings of conditioning modules include two or more conditioning modules connected together in series.

8. The conditioning system of claim 1, wherein the plurality of conditioning modules extend around about 180 degrees or more of the rim of the steering wheel.

9. The conditioning system of 7, wherein individual conditioning modules within the two or more strings are located in an alternating relationship as the strings extend around the steering wheel.

10. The conditioning system of claim 7, wherein individual conditioning modules within the two or more strings are located one after another without any intervening conditioning modules.

11. The conditioning system of claim 1, wherein an interior surface of the rim includes an insulating layer that extends partially or fully around the interior surface of the rim.

12. The conditioning system of claim 1, wherein the plurality of conditioning modules are connected to the rim by a thermal transfer material.

13. The conditioning system of claim 1, wherein the one or more thermoelectric devices and the one or more heat sinks are each connected together by one or more bosses, or the one or more heat sinks have an area that is greater than an area of the one or more thermoelectric devices.

14. The conditioning system of claim 1, wherein the one or more thermoelectric devices have a planar surface that contacts a planar surface of an interior of the rim.

15. The conditioning system of claim 1, wherein the plurality of conditioning modules are connected to one or more temperature sensors that monitor a temperature of the conditioning system, the rim, the steering wheel, the one or more thermoelectric devices, or a combination thereof.

16. A climate controlled steering wheel including the conditioning system of claim 1.

17. The conditioning system of claim 1, wherein the central cavity is centered about a central axis of the rim.

18. The conditioning system of claim 1, wherein fins of the one or more heat sinks are located within the stream of fluid created by the one or more air movers, and/or the fins are arranged parallel to a direction of the of the stream of fluid through the hollow channel.

19. The conditioning system of claim 1, wherein the first piece is made of or includes a conductive material, and the second piece is made of or includes an insulating material.

20. The conditioning system of claim 1, wherein the first piece has a portion that extends over and overlaps all or a portion of the second piece.

* * * * *

UNITED STATES PATENT AND TRADEMARK OFFICE
CERTIFICATE OF CORRECTION

PATENT NO. : 11,110,952 B2  
APPLICATION NO. : 16/475098  
DATED : September 7, 2021  
INVENTOR(S) : Pine Page 1 of 1

It is certified that error appears in the above-identified patent and that said Letters Patent is hereby corrected as shown below:

In the Claims

Column 11, Line 27, delete "device and a part" and insert --devices and a part--

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*